United States Patent [19]
Applebaum

[11] 3,806,924
[45] Apr. 23, 1974

[54] PLATFORM MOTION COMPENSATING FOR AIRBORNE RADARS

[75] Inventor: Sidney P. Applebaum, Liverpool, N.Y.

[73] Assignee: The United States of America as represented by the Secretary of the Navy, Washington, D.C.

[22] Filed: Feb. 13, 1973

[21] Appl. No.: 331,716

[52] U.S. Cl. .............................. 343/7.7, 343/17.1 R
[51] Int. Cl. ............................................... G01s 9/42
[58] Field of Search ............ 343/7.7, 17.1 R, 16 M, 343/16 LS

[56] References Cited
UNITED STATES PATENTS

| | | | |
|---|---|---|---|
| 3,161,873 | 12/1964 | Hollingsworth | 343/7.7 |
| 3,390,390 | 6/1968 | Vehrs, Jr. | 343/17.1 R |
| 3,392,387 | 7/1968 | Kirkpatrick | 343/7.7 |
| 3,438,030 | 4/1969 | Dickey, Jr. | 343/7.7 |
| 3,618,093 | 11/1971 | Dickey, Jr. | 343/17.1 R |
| 3,720,941 | 3/1973 | Ares | 343/17.1 R |
| 3,727,220 | 4/1973 | Brennan et al. | 343/7.7 |
| 3,735,400 | 5/1973 | Sletten et al. | 343/7.7 |

OTHER PUBLICATIONS
Skolnik, M. I., Radar Handbook, McGraw-Hill, 1970, pp. 18-7 to 18-9.

Primary Examiner—T. H. Tubbesing
Assistant Examiner—G. E. Montone
Attorney, Agent, or Firm—R. S. Sciascia; L. I. Shrago

[57] ABSTRACT

Platform motion of an airborne radar system of the moving target indicator type is compensated for by an adaptive displaced phase center antenna arrangement. The signals detected by the two receiving beams are combined to form sum and difference signals. Thereafter, the sum signals have subtracted therefrom delayed sum, difference and delay difference signals which are weighted by coefficients determined by cross-correlating these signals and the output signal obtained from the above subtraction. The system thus combines the DPCA and the side lobe cancellation concept to eliminate signals received from stationary targets. The receiving beams may be squinted to compensate for antenna rotation.

9 Claims, 5 Drawing Figures

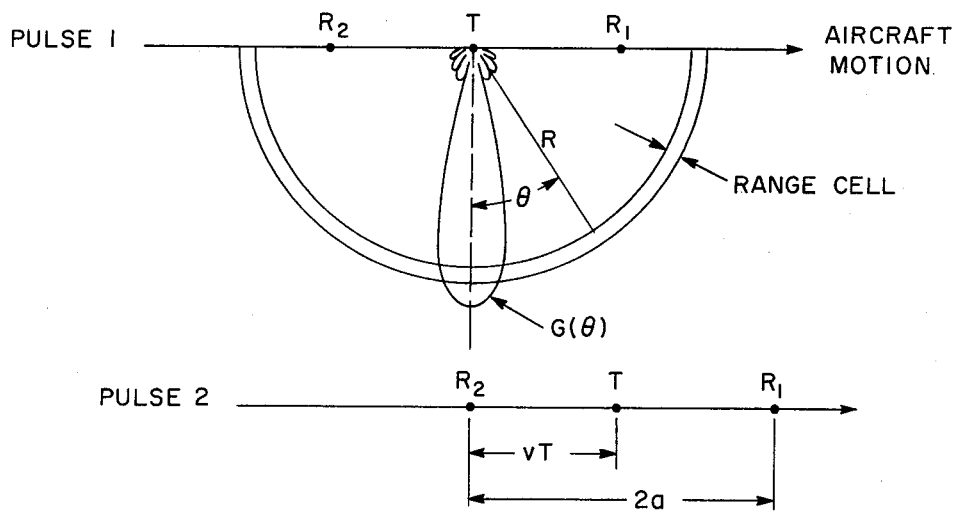
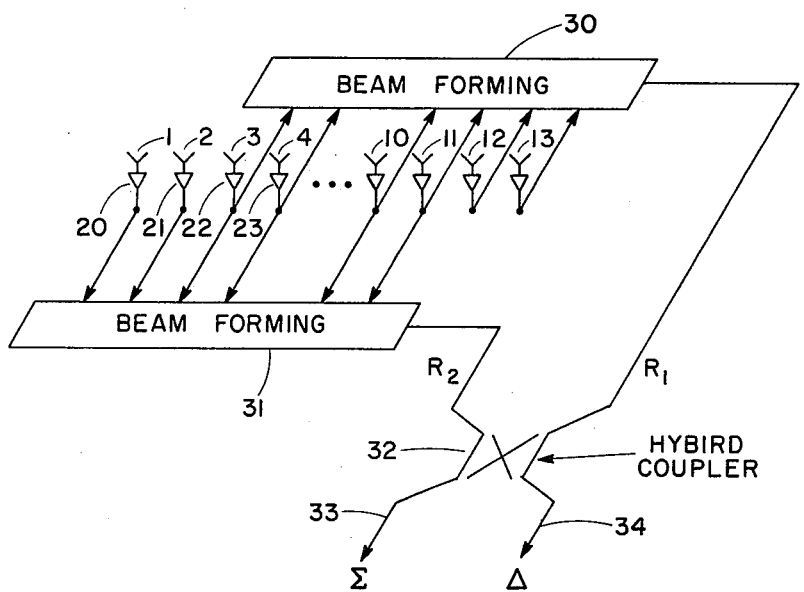
Fig. 1
Fig. 2

PLATFORM MOTION COMPENSATING FOR AIRBORNE RADARS

The present invention relates generally to airborne radar systems of the moving target indicator type and, more particularly, to an arrangement for compensating for the platform motion of such radar systems.

In the airborne M.T.I. radar system, returns from fixed objects are considered clutter and, consequently, some provision must be included in the signal processing circuits for eliminating these returns from the target display. The difficulty of achieving clutter cancellation arises from the motion of the aircraft and the antenna rotation. Antenna rotation spreads the main beam clutter power spectrum directly with the rotation rate and inversely as the antenna beam width. The effect of the linear motion of the aircraft upon the clutter cancellation depends on the boresight angle of the antenna. When the antenna is pointing abeam, linear platform motion spreads the clutter power spectrum directly with the aircraft velocity and antenna beam width. When the antenna is pointing fore or aft, the spread of the clutter spectrum in the main beam is much less than it is abeam, but the moving target indicator problem is complicated by the variation of the centroid of the clutter with range. At intermediate antenna pointing angles, both spreading and range variation of the centroid occur due to the aircraft motion.

Platform motion effects, as is well known, may be compensated by using two identical aperture weighting functions whose phase centers are displaced in the plane of the aperture. In one arrangement which compensates for the component of motion which is perpendicular to the axis of the beam, a first pulse is transmitted with the aperture weighted for transmit having its phase center at a location T. This pulse is thereafter received in two channels, both using the same relative aperture weighting with their phase centers at $R_1$ and $R_2$, ahead of and behind the transmit center T by equal amounts. With exact compensation, one pulse repetition period later, these phase centers will have advanced by an amount such that $R_2$ moves to T and T to $R_1$ due to the aircraft motion during this same period.

Since the antenna patterns associated with the two received channels are identical, the signal received in the $R_1$ channel, the one ahead of the transmit center, from any stationary object on the first pulse will be identical to the signal received in the $R_2$ channel on the second pulse delayed, of course, by the pulse repetition period. In the case where the phase centers of the received channels are separated by twice the motion of the aircraft between transmitted pulses and where, as mentioned hereinbefore, the received patterns are identical, perfect clutter cancellation, in the absence of antenna scanning, may be achieved by simply subtracting the signal received on $R_1$, delayed, from the signal received on $R_2$. Techniques based on this principle are known as DPCA — Displaced Phase Center Antenna.

In one implementation of this DPCA technique, the two received channels are first combined into sum and difference channels, and, then, these channels are appropriately delayed and subtracted. However, because the clutter characteristics vary with, for example, antenna pointing angle, range, antenna rotation rate and aircraft velocity, this approach is not too effective since it cannot respond to changing operational parameters.

It is, accordingly, a primary object of the present invention to provide a clutter rejection arrangement for M.T.I. radars which utilizes aspects of both the displaced phase center antenna technique and the side lobe canceling technique.

Another object of the present invention is to provide an adaptive displaced phase center antenna arrangement.

Another object of the present invention is to provide a DPCA system for compensating for platform motion in an airborne M.T.I. radar wherein the receiving channels are weighted by a closed-loop correlation process that optimizes the performance of the system for various operational parameters.

Other objects, advantages and novel features of the invention will become apparent from the following detailed description of the invention when considered in conjunction with the accompanying drawings wherein:

FIG. 1 illustrates the operating principle of the displaced phase center antenna;

FIG. 2 schematically illustrates one arrangement for forming the two receiving antenna patterns required in the DPCA system;

Figure 3:
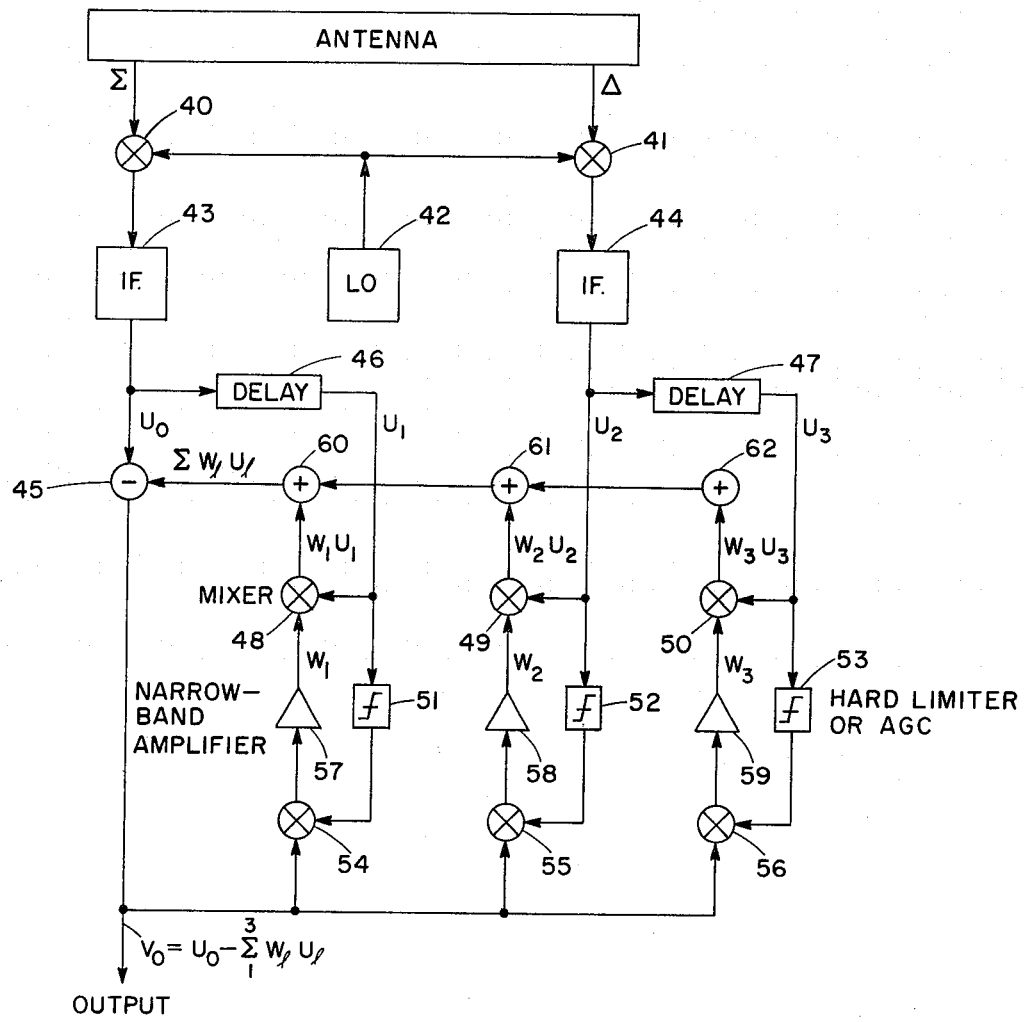
FIG. 3 illustrates one embodiment of the present invention wherein the adaptive DPCA utilizes intermediate frequency control circuitry.

Referring now to FIG. 1 of the drawings, it will be seen that in the basic DPCA system, a first pulse is transmitted with the aperture weighted for transmit having its phase center at T on line 1. This pulse is subsequently received in the two channels $R_1$ and $R_2$, with $R_1$ being ahead of location T in the direction of platform motion and $R_2$ behind it by an equal distance. One pulse repetition period later, the various centers have moved to the positions shown in line 2, and, as noted hereinbefore, when the displacement of these centers both in direction and distance corresponds to that of the aircraft during a particular interpulse period and when their separations are correct for the prevailing operating conditions, then the signals received at centers $R_1$ and $R_2$ from a particular stationary object with a first pulse and second pulse will be identical.

It has been conventional practice to combine these signals into sum and difference channels. Thereafter, these channels are appropriately delayed and subtracted to accomplish the clutter cancellation.

In the present invention, the sum and difference channels, $\Sigma$ and $\Delta$, are still formed. However, these channels are processed with the $\Sigma$ beam being treated as a main signal channel and a delayed $\Sigma$ beam, the $\Delta$ beam, and a delayed $\Delta$ beam being treated as auxiliary channels. All of the auxiliary channels are weighted adaptively to cancel interference in the main channel. The configuration is similar to a typical side lobe canceler. The various complex weights, $w_1, w_2, w_3$, are derived by correlating the output $v_0$ in the main channel with each of the signals appearing in the auxiliary channels. The capability of this system may be demonstrated as follows:

Assume that the antenna is pointing directly abeam of the platform motion as shown in FIG. 1 and Let: $G_X(\Theta)$ = transmit pattern
$G_R(\Theta)$ = receive pattern of each receive channel relative to its own phase center
$2a$ = separation of phase centers of the receive channels in wavelengths
$vT$ = interpulse displacement of the aperture in wavelengths due to aircraft motion The sum and difference signals respectively, from the clutter within a range cell at angle $\Theta$ and at small depression angles will be proportional to, $$\Sigma(\Theta) = G_x(\Theta) G_R(\Theta) \cos(2\pi a \sin \Theta) \quad (1)$$

$$\Delta(\Theta) = G_x(\Theta) G_R(\Theta) \sin(2\pi a \sin \Theta)$$

The delayed sum and difference channel signals from the same patch of clutter will be:

$$\Sigma_T(\Theta) = \Sigma(\Theta) \exp{-j4\pi vT\sin\Theta} \quad (2)$$

$$\Delta_T(\Theta) = \Delta(\Theta) \exp{-j4\pi vT\sin\Theta}$$

and the output of the adaptive DPCA $$v_o(\Theta) = \Sigma(\Theta) - w_1\Sigma_T(\Theta) - w_2\Delta(\Theta) - W_3\Delta_T(\Theta) \quad (3)$$

$$= G_x(\Theta)G_R(\Theta) \{\cos(2\pi a\sin\Theta)(1-w_1\exp{-j4\pi vT\sin\Theta})$$
$$-\sin(2\pi a\sin\Theta)(w_2+w_3\exp{-j4\pi vT\sin\Theta})\}$$

If $a = vT$, then the weight values
$w_1 = 1$ and $w_2 = w_3 = j$
make $v_0(\Theta)$ identically zero independent of $G_x(\Theta) G_R(\Theta)$.

If $a \neq vT$, the best choice for the weights depends upon the roundtrip pattern $G_x(\Theta) G_R(\Theta)$.

However, note that with $$w_1 = 1$$
$$w_2 = w_3 = jvT/a$$

and for $\Theta \to 0$, $|v_o(\Theta)|$ approaches $$|v(\Theta)| = |G_x(\Theta)G_R(\Theta)| 16\pi^3/3$$
$$(a^2 - (vT)^2) |vT| \sin^3\Theta \quad (4)$$

If the roundtrip pattern is very narrow and has low sidelobes the solution given above can provide excellent cancellation when "$a$" is a few wavelengths and $|vT| < a$.

In the adaptive DPCA the weights are determined so as to minimize the integral of $|v_o(\Theta)|^2 C(\Theta)$ where $C(\Theta)$ is the cutter cross section at angle $\Theta$ averaged in range, and so will be affected by the shape of the roundtrip pattern and the distribution of the clutter.

A suitable antenna for forming the two receiving patterns for channels $R_1$ and $R_2$ is shown in FIG. 2. Here the antenna consists of a linear, uniformly spaced array of signal receiving elements 1, 2, 3, 4 etc. having affiliated preamplifiers 20, 21, 22 and 23 etc. Channel $R_1$, in this particular example, is obtained by using all of the individual detecting elements except for the two, numbers 1 and 2 on the left as viewed in this FIG. Channel $R_2$ is obtained by likewise using all of the elements except for the two, numbers 12 and 13 on the right.

After preamplification, the signals are supplied to suitable beam formers 30 and 31 whose operation is well known in the art. These beam formers consist of means for combining the signals received by the antenna elements to form a weighted sum of these signals depending upon the beam geometry desired. The output of beam former 30 corresponds to channel $R_1$, the output from beam former 31 corresponds to channel $R_2$. These channels are coupled to a hybrid coupler 32 to develop the $\Sigma$ and $\Delta$ beams 33 and 34, respectively.

The array shown in FIG. 2 produces identical antenna patterns for the two channels with the connections shown. The phase centers are displaced by twice the spacing between adjacent antenna elements. It would be pointed out that if three elements are omitted from each channel, that is, if element 3 on the left is disconnected from beam former 30 and element 11 disconnected from beam former 31 then the phase center displacement will be three times the interelement spacing. The particular phase center displacement desired may be realized by appropriate switching and weighting techniques. However, the magnitude of this displacement should be chosen to be twice the motion of the platform between pulses for some nominal aircraft speed.

It would be pointed out that as far as the present invention is concerned, it is not necessary to form the two channels $R_1$ and $R_2$ if the $\Sigma$ and $\Delta$ beams can be formed directly.

Once the delayed $\Sigma$, and delayed $\Delta$ channels are formed, they are combined with weights that are derived by closed-loop correlation circuits that optimize the performance in flight for the existing clutter environment, aircraft speed, antenna pointing angle and antenna rotation. In effect, the DPCA technique and the side lobe canceling technique are combined to provide an adaptive means to compensate for platform motion.

Referring now to FIG. 3, the RF signals in the $\Sigma$ and $\Delta$ channels are fed to mixers 40 and 41 which have as their other input a signal from local oscillator 42. The resulting IF signals are amplified in amplifying stages 43 and 44.

The output from the IF amplifying stages in the $\Sigma$ channel, $u_o$, goes directly to a subtraction circuit 45 and also to a delay circuit 46 which subjects this signal to a delay equal to the interpulse period. The resultant delayed signal, $u_1$, is fed to a hard limiter or an automatic gain control circuit 51 and then to a mixer 54 which has as its other input, the output signal from the subtracting circuit 45, which is also the output of the over-all system.

The output of mixer 54 is supplied to a narrow band amplifier 57 and the output of this amplifier is the weighting signal $w_1$. This weighting signal and signal $u_1$ serve as the inputs to a mixer 48 which develops the product signal $w_1u_1$ which is fed to adder 60.

It will be recognized that mixer 54 and narrow band amplifier 57 perform as a cross-correlator, for signals $u_1$ and $v_o$ and that this correlator, mixer 48, adder 60, and subtraction circuit 45 are interconnected in a closed-loop system which automatically operates to minimize the clutter signal present in the output circuit.

The IF signal in the $\Delta$ channel is subjected to the same type of treatment, that is, $u_2$ is fed to a hard limiter or AGC circuit 52 and then to an input of a mixer 55 which has as its other input the output signal. Mixer 55 and narrow band amplifier 58 develop by a similar cross-correlation process, the second weighting signal $w_2$. This signal and $u_2$ serve as the inputs to the series mixer 49 which produces the product signal $w_2 u_2$ for adder 61.

The signal in the $\Delta$ channel is also delayed in circuit 47 by an amount equal to the interpulse period. Thereafter, this signal, $u_3$, receives the same treatment, namely, it is supplied to a hard limiter 53, then to mixer 56 which has the output signal as its other input. Mixer 56 and narrow band amplifier 59 yield the third weighting signal $w_3$ and then this signal and $u_3$ are supplied to mixer 53 so as to produce product signal $w_3 u_3$ for the input to adder 62.

Adders 60, 61 and 62 are serially interconnected so that the output of adder 60 is a summation of the individual input signals, namely $\Sigma w_i u_i$. This summation signal is subtracted from the IF, $\Sigma$ signal, $u_o$, to give an output signal $v_o$, which is equal to $$u_o - \sum_1^3 w_i u_i.$$

Adders 60, 61 and 62 may, in fact, be combined into a single adding circuit designed with three inputs.

The purpose of the hard limiters in the system of FIG. 3 is to keep the effective loop gain of the control circuitry from varying too rapidly with changes in the input signal level. The hard limiter normalizes the amplitude of the signal passing through it so that a constant amplifying signal is fed into the correlator mixer. It also preserves phase information. This same function may be performed by an automatic gain control circuit.

It would also be pointed out that the various delay lines shown in FIG. 3 only have to be matched to a fraction of the signal pulse envelope. Phase match is not required since the weights $w_1$, $w_2$, $w_3$ will automatically compensate for any phase mismatch. This feature is an important advantage of the adaptive DPCA system of the present invention.

The adaptive DPCA also has the capability to compensate somewhat for antenna rotation. This can be understood by regarding the $\Delta$ pattern as an approximation to the derivative of the $\Sigma$ pattern near the peak of the main beam. The adaptive DPCA can therefore use the $\Delta$ channel and the $\Delta$ channel delayed to compensate for rotation. Assume $\Delta(\Theta) \cong k \, (d\Sigma/d\Theta)$ where $k$ is a proportionality constant. Then with rotation only, $$v_o(\Theta) = \Sigma(\Theta) - w_1 \Sigma(\Theta + \omega T) - w_2 \Delta(\Theta) - w_3 \Delta(\Theta + \omega T) \quad (5)$$

where: $\omega T$ = interpulse rotation
or for $w_1 = 1$
and $w_3 = w_2 = -(\omega T/2k)$ $$v_o(\Theta) \cong \Sigma(\Theta) + (\omega T/2)(d\Sigma(\Theta)/d\Theta) - \{(\Theta + wT) - (\omega T/2)(d\Sigma(\Theta + WT)/d\Theta)\} \quad (6)$$

or $$v_o(\Theta) \cong \Sigma[\Theta + (\omega T/2)] - [\Theta + (\omega T/2)] = 0 \quad (7)$$

This assumes the rotation is about the phase center of the $\Sigma$ beam. Compensation for antenna rotation may also be obtained by squinting the beams formed for the two receiving channels $R_1$ and $R_2$. For this technique to be effective, the transmit beam should have the same shape as each of the receiving beams.

Figure 4:
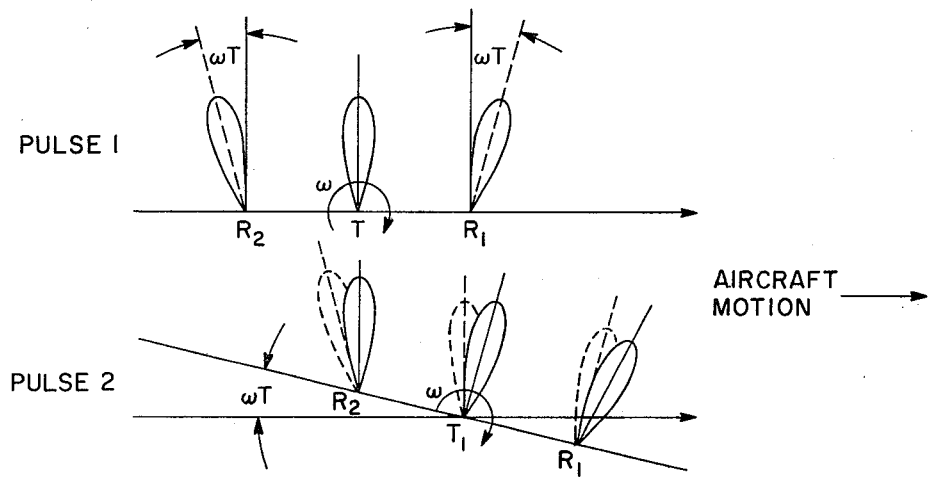
FIG. 4 shows one beam arrangement for compensating for antenna rotation when this rotation is in the direction of platform motion.

FIG. 4 illustrates the situation where the antenna rotation is in the direction of platform motion. For this case, the antenna patterns for $R_1$ and $R_2$ are squinted outwardly by an amount $\omega T$ which equals the angular rotation of the array axis during the interpulse period. As shown in line 2 of this FIG., one pulse period later, the receive center $R_2$ corresponds to the transmit center T in line 1. Thus, the signal received on $R_1$ for pulse 1 will be very closely approximated by the signal received on $R_2$ for pulse 2.

Figure 5:
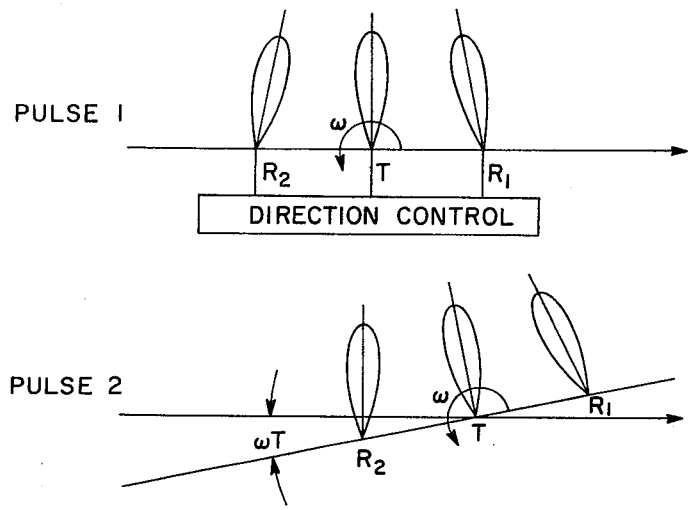
FIG. 5 shows a similar arrangement when antenna rotation and platform motion are in opposite directions.

When the antenna rotation is in a direction opposite to the aircraft motion, the beams at $R_1$ and $R_2$ have to be squinted inwardly or cross-eyed as shown in FIG. 5. The amount of this displacement is again equal to the interpulse rotation angle of the antenna axis. For this type of compensation the receive beams have to be squinted outward on one side of the aircraft and squinted inward on the other. For 360° antenna rotation, the compensation, therefore, must be switched whenever the antenna passes through the fore and aft directions.

It should be appreciated that the situation depicted in FIGS. 4 and 5 neglects the rotation that occurs during the pulse flight time, and, consequently, the analysis presented is correct only for scatters at very close range. However, this deficiency can be cured if the receive beams are kept fixed in space during each PRF interval. Thus, the beam directions at the time of a particular transmission, are thereafter electronically maintained until the next pulse is sent. This condition is represented by the dotted beam patterns of FIG. 4. The receive beams will, thus, be periodically rather than continuously redirected in space, and this reduction will occur at the time of radiation of a particular search pulse. An exact correction may also be obtained for one particular range in an alternative manner by leading the transmit beam by an angle $\Theta = (2\omega \hat{R}/C)$ where $\hat{R}$ is the range from which the signal is received.

What is claimed is:

1. A clutter elimination system which compensates for the platform motion of an airborne M.T.I. radar system of the type wherein search pulses are periodically radiated from an aircraft in a directional beam the combination of means for forming a pair of similarly shaped receiving beams which are separated by a distance related to a predetermined aircraft velocity;

means for combining the signals detected by said receiving beams so as to form sum and difference signals;

a subtraction circuit which produces an output difference signal from signals fed to its two inputs;

means for coupling said sum signals to one input of said subtraction circuit;

means for delaying said sum and difference signals by a time interval equal to the period between successive radiated search pulses;

means for cross-correlating the delayed sum signals $u_1$, said difference signals $u_2$ and the delayed difference signals $u_3$ with the output difference signal of said subtraction circuit to thereby develop weighting signals $w_1$, $w_2$ and $w_3$, respectively;

means for multiplying the delayed sum signals, said difference signals and the delayed difference signals with said weighting signals $w_1$, $w_2$ and $w_3$, respectively, thereby to produce product signals $w_1 u_1$, $w_2 u_2$, $w_3 u_3$;

means for combining said product signals; and means for feeding the resultant summation signal to the other input of said subtraction circuit, the output difference signal of said subtraction circuit being free of any clutter signals returned from stationary objects which have been irradiated by said search pulses.

2. In an arrangement as defined in claim 1 wherein said delayed sum, difference and delayed difference signals are subjected to hard limiting so as to have constant amplitudes before being cross-correlated with said output difference signal of said subtraction circuit.

3. In an arrangement as defined in claim 1 wherein said sum and difference signals are mixed with a local oscillator signal to lower their frequency to an IF value before said sum signals are coupled to said subtraction circuit and before said sum and difference signals are delayed.

4. In an arrangement as defined in claim 1 wherein said means for cross-correlating the delayed sum signals, the difference signals and the delayed difference signals with the output difference signal of said subtraction circuit comprises a mixer and a narrow band amplifier interconnected such that the output of said mixer serves as the input to said narrow band amplifier.

5. In an arrangement as defined in claim 1 wherein said sum signals, difference signals and delay difference signals experience automatic gain control so as to have constant amplitudes before being cross-correlated with the output difference signal of said subtraction circuit.

6. In an arrangement as defined in claim 1 wherein said means for combining the signals detected by said receiving beams so as to form sum and difference signals comprising a hybrid coupler.

7. In an arrangement as defined in claim 1 wherein said pair of said similarly shaped receiving beams are squinted inwardly whenever the search pulses are radiated in the direction of aircraft movement and outwardly whenever these pulses are radiated in a direction opposite to that of aircraft movement, thereby to compensate for rotation of the directional beam in which said search pulses are periodically radiated.

8. In an arrangement as defined in claim 7 wherein said receiving beams are squinted by an amount related to the angular rotation of said aforementioned direction beam in the time interval between successively radiated search pulses.

9. In an arrangement as defined in claim 1 wherein said similarly shaped receiving beams are spaced on opposite sides of the directional beam in which said search pulses are periodically radiated and are equally spaced therefrom.

* * * * *